United States Patent
Fiss et al.

(10) Patent No.: US 11,959,824 B2
(45) Date of Patent: Apr. 16, 2024

(54) METHOD FOR MONITORING A BELT DRIVE

(71) Applicant: ContiTech Antriebssysteme GmbH, Hannover (DE)

(72) Inventors: Tim Fiss, Hannover (DE); Philipp Freiheit, Hannover (DE); Arne Hinz, Burgdorf (DE); Svenja Rosenbohm, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 0 days.

(21) Appl. No.: 17/594,772

(22) PCT Filed: Mar. 10, 2020

(86) PCT No.: PCT/EP2020/056286
§ 371 (c)(1),
(2) Date: Oct. 29, 2021

(87) PCT Pub. No.: WO2020/221496
PCT Pub. Date: Nov. 5, 2020

(65) Prior Publication Data
US 2022/0205868 A1  Jun. 30, 2022

(30) Foreign Application Priority Data
Apr. 30, 2019  (DE) .................. 10 2019 206 169.9

(51) Int. Cl.
*G01M 13/023*  (2019.01)
*F16H 57/01*  (2012.01)

(52) U.S. Cl.
CPC .......... *G01M 13/023* (2013.01); *F16H 57/01* (2013.01); *F16H 2057/014* (2013.01); *F16H 2057/018* (2013.01)

(58) Field of Classification Search
CPC .................. G01M 13/023; F16H 57/01; F16H 2057/014; F16H 2057/018
See application file for complete search history.

(56) References Cited

U.S. PATENT DOCUMENTS

| | | | |
|---|---|---|---|
| 5,019,017 A | 5/1991 | Monch | |
| 9,228,909 B1* | 1/2016 | Rembisz | ................... F16H 7/02 |
| 2008/0006097 A1 | 1/2008 | Stauffer et al. | |
| 2008/0308391 A1* | 12/2008 | May | ....................... B65G 43/02 |
| | | | 198/810.02 |
| 2010/0131232 A1* | 5/2010 | Taylor | ................... F02B 77/081 |
| | | | 702/147 |
| 2018/0119790 A1* | 5/2018 | Kanduri | ................... F16H 57/01 |
| 2018/0128352 A1 | 5/2018 | Scholzen et al. | |

(Continued)

FOREIGN PATENT DOCUMENTS

| | | |
|---|---|---|
| DE | 102009003763 A1 | 10/2010 |
| DE | 102015208679 A1 | 11/2016 |

(Continued)

*Primary Examiner* — Eric S. McCall
(74) *Attorney, Agent, or Firm* — Gregory Adams; Richard Wolf

(57) ABSTRACT

A method for monitoring a drive belt is disclosed. A drive pulley driving by a drive motor and having a drive belt is provided. First and second markings are provided on the belt. The markings are detected. A correlation is determined and a signal is generated if a reference value is exceeded.

26 Claims, 2 Drawing Sheets

(56) References Cited

U.S. PATENT DOCUMENTS

2021/0101753 A1* 4/2021 Kataria .................. B65G 23/44
2021/0372873 A1* 12/2021 Karlsson ................. G01L 5/105

FOREIGN PATENT DOCUMENTS

DE  202016008121 U1  3/2017
EP      0382115 A2   8/1990
WO    2016177883 A1  11/2016

* cited by examiner

METHOD FOR MONITORING A BELT DRIVE

SUMMARY

The invention relates to a method for monitoring a belt drive with at least one drive pulley driven by a drive motor, a driven pulley and at least one power-transmitting endless drive belt which is in the form of a traction belt and wraps around the drive and driven pulleys circumferentially over a partial circumference in each case, wherein the belt has at least one first marking and at least one first sensor element assigned to the belt is provided, wherein the passage (or the passing) of the first marking is detected by the first sensor element during the belt revolution and the first sensor element preferably has electronic devices for outputting a signal $S_R$ dependent on the detection of the first marking. A particular use of the method is also disclosed, as well as a belt drive adapted to the method, in particular a belt drive in a steering gear of a motor vehicle.

Belt drives for transmitting torques and rotary movements are known in many technical fields and are considered to be lightweight, low-noise drive systems that transmit high torques. In this case, the drive belt wraps around a drive pulley or roller and a driven pulley or roller in each case over a partial circumference or an angle of wrap and transmits the forces there through friction and/or through positive locking. This can serve to transmit a continuous movement, for example in order to transmit the rotation of the drive unit with an internal combustion engine, with a hybrid engine or with an electric motor of a vehicle to the wheels of the vehicle. However, changes to the position of the output unit can also be made in this way, for example in order to transmit a steering movement of a steering wheel of an electromechanical steering system of a vehicle to its wheels.

Toothed belts are known as drive belts, as are flat belts, V-belts or V-ribbed belts.

Condition monitoring of drive belts that is required during the operating time can currently only be implemented through visual inspection and mechanical tests. In the case of encapsulated belt drives, i.e. belt drives that are enclosed in a dust-tight and watertight housing, permanent visual inspection is not possible for construction-related reasons.

Encapsulated belt drives are found in particular in steering gears for vehicles, since these gears are arranged in an area that is exposed to harsh environmental conditions and heavy soiling. So far, steering belt drives have often been designed for a service life that does not necessarily mean that an interim inspection is necessary. However, with such a design maxim, the construction quickly results in all components being oversized, which in turn can increase the weight and thus the energy consumption.

In the case of toothed belt drives, for example, a key assessment criterion for the condition of the belt is the detection of a skipped tooth. The skipped tooth indicates a later belt failure, which is why early detection is absolutely relevant to functional reliability. With such a skipped tooth, the drive belt pulley spins underneath the belt when overloaded, the tooth of the belt skips on the belt pulley several times, with the result that the tooth area of the belt wears out. To date, it has not been technically possible to monitor such skipped teeth or the number of such skipped teeth.

Such monitoring would, however, be desirable, especially for the autonomous driving functions and vehicles that have emerged in the meantime. For autonomous vehicles, the toothed belt in a steering system is an absolutely safety-relevant component and must be monitored necessarily. In the event of a complete failure of the power transmission through belts, an emergency device/system must also be available so that the vehicle can still be steered.

In any case, it makes sense to monitor the rotations of the belt pulleys and belts in order to detect skipped teeth as an indication of an impending belt failure (predictive maintenance) and also to obtain early indications of possible damage to the belt.

DE 20 2016 008 121 U1 discloses a belt drive for this purpose, consisting of a belt pulley, a belt and a monitoring device. A "marking" is respectively applied to the belt and to the belt pulley. A signal is triggered when the markings on the belt and the drive pulley are opposite one another. The markings for identifying the position can be based on various sensor technologies, for example based on optical, inductive, capacitive or magnetic effects.

The monitoring described there can be used to detect, inter alia, skips of toothed or synchronous belts which require immediate maintenance. Slip can also be detected. With the device described there, it is also possible, taking into account further belt parameters, to make exact statements about loads to which the belt was exposed over a period of time in the past.

WO 2016 177883 A1, which belongs to the same patent family, also discloses such a belt drive in which complementary markings are provided on the belt and pulley for monitoring purposes. The corresponding monitoring method is also claimed here.

However, the systems and methods described here have the disadvantage that the belt must be precisely positioned in relation to the pulleys, which is difficult, in particular after repairs, for example after fitting replacement pulleys or replacement belts.

The object of the invention was therefore to provide a monitoring method and a belt drive adapted to it, which permits the simplest possible monitoring without complicated positioning, adjustment and assembly work, in which the position and the relationship between the belt and pulley can also be arbitrary. Furthermore, the object was to provide a monitoring method which can react in a certain way in a self-learning manner to changes in the drive and wear conditions of the drive system without catalogs of parameters and settings having to be constantly checked.

This object is achieved by the features of the main claim. Further advantageous embodiments are disclosed in the dependent claims.

In this case, the rotor, that is to say the rotating part of the drive motor, has at least one second marking and a second sensor element which is provided with corresponding electronic devices and is assigned to the drive motor is provided. While the rotor is rotating, the passage, i.e. the "passing", of the second marking is detected by the second sensor element and a signal $S_M$ dependent on the detection of the second marking is output. Furthermore, a computing unit provided with memories and processors for processing the signals $S_R$ and $S_M$ is provided, wherein a temporal or local correlation of the occurrence of the signals $S_R$ and $S_M$ is calculated in the computing unit when the drive belt is new and is stored as a reference value. The associated signals $S_R$ and $S_M$ are then repeatedly determined for further specified belt revolutions or periods of time and their current temporal or local correlation of the occurrence is compared with the reference value, wherein a warning or alarm signal is output by the computing device after a specified tolerance value between the current correlation and the reference value has been exceeded.

With regard to the basic setting, i.e. the positioning of the belt and belt pulley, the inventive method does not require any complicated assembly or preset correlation. Rather, the actually existing correlation is determined by a self-learning process and is checked by frequent repetition and constant comparison with the reference value obtained when new. In this way, changes within the constellation of the drive belt and the associated pulleys and other elements can be assessed.

For example, very simple condition monitoring of drive belts can be implemented without visual inspection and mechanical tests, even with encapsulated belt drives. A skipped tooth or belt rubbing or slipping above certain limit values can thus easily be determined and its influence on the damage to the belt or the gear can be assessed.

A comparison of the current correlation of the occurrence of the signals with the reference value can be carried out directly or in a manner derived from various parameters. On the one hand, a local correlation and, on the other hand, a conversion into speeds and revolutions are thus possible before the comparison.

An advantageous development with regard to a clearly local correlation consists, for example, in the fact that the first sensor element has electronic devices for outputting a signal $S_R$ proportional to the number of belt revolutions, that the rotor position of the drive motor is determined by the second sensor element and is output as a signal $S_M$ proportional thereto, that the initial relationship between a specified or predefined number $N_R$ of belt revolutions and the rotor position determined for this, which is present when the belt drive is new, is calculated in the computing unit and is stored as a reference value, wherein the associated rotor positions are then repeatedly determined for further belt revolutions corresponding to the specified number $N_R$ and their current relationship is compared with the reference value, wherein a warning or alarm signal is output by the computing device after a specified tolerance value between the current relationship and the reference value has been exceeded. Such a determination may require a lot of storage space in the computing unit, but is extremely precise and detects even the smallest deviations in the position of the second sensor element or the rotor position.

A further advantageous development in the context of the utilization of speeds and revolutions consists in the fact that the first sensor element has electronic devices for outputting a signal $S_R$ proportional to the number of belt revolutions, that the rotor revolutions of the drive motor are determined by the second sensor element and are output as a signal $S_M$ proportional to the speed of the drive motor, that the relationship between a specified or predefined number $N_R$ of belt revolutions and the motor revolutions determined for this, which is present when the drive belt is new, is calculated in the computing unit and is stored as a reference value, wherein the associated motor speeds are then repeatedly determined for further belt revolutions corresponding to the specified number $N_R$ and their current relationship is compared with the reference value, wherein a warning or alarm signal is output by the computing device after a specified tolerance value between the current relationship and the reference value has been exceeded. The number of belt revolutions and the associated motor speeds can be set in this case and the repeated measurements or measurement periods can thus be designed variably such that, for example, one measurement can be carried out per hour or per day.

A further advantageous embodiment consists in the fact that, for monitoring a belt drive of a steering gear provided with at least two endless drive belts, in which two drive pulleys arranged on a common drive shaft driven by a drive motor are provided. In a steering gear constructed in this way with a redundant drive, there are also two driven pulleys which are arranged on a common output shaft or on two output shafts. Both belts have a marking and both belts are each assigned a sensor element which detects the respective belt marking. Here, too, the sensor elements have electronic devices for outputting signals $S_{R1}$ and $S_{R2}$ which are dependent on the detection of the belt markings, wherein a temporal or local correlation of the occurrence of the signals $S_{R1}$, $S_{R2}$ and $S_M$ is calculated in the computing unit when the drive belt is new and is stored as a reference value, wherein the associated signals $S_{R1}$, $S_{R2}$ and $S_M$ are then repeatedly determined for further specified belt revolutions or periods of time and their current temporal or local correlation of the occurrence is compared with the reference value.

In particular in combination with a further advantageous embodiment which consists in the fact that an angular offset between the drive belt and the drive belt pulley and/or between the drive belts is determined in the computing unit by way of a change in the temporal or local correlation of the occurrence of the signals $S_{R1}$, $S_{R2}$ and $S_M$, a statement regarding the relationship of the two drive belts with respect to one another and their offset which has possibly arisen during revolution is also obtained. In the case of steering gears with a redundant drive design, i.e. in our case with two drive belts, each of which is designed for the total output, an important checking method is provided here, which can both determine the failure of a belt or predict the impending failure of a belt and allow continued monitoring of an individual belt after such a failure.

A further advantageous embodiment consists in the fact that the tolerance value between the current relationship and the reference value is specified as a difference in location, time or speed corresponding to a predetermined slip. In addition to the self-learning behavior of the method according to the invention, such a measure also makes it possible to include predefined catalogs in the assessment.

The same applies to a further advantageous embodiment which consists in the fact that the drive belt or belts is/are in the form of toothed belts and at least one difference in location, time or speed corresponding to a skipped tooth is specified as the tolerance value between the current relationship and the reference value.

A further advantageous embodiment consists in the fact that the rotor rotation or the rotor position is determined via the CAN bus of the motor and is output as a signal $S_M$ and is processed in the computing unit for the purpose of calculating the correlations. Such an embodiment is the best way of dealing with existing systems or signals for carrying out the method according to the invention.

A further advantageous embodiment consists in the fact that the belt markings are detected by the associated sensor elements using optical, inductive, capacitive or magnetic methods. The type of marking and sensor system can be arbitrary, as long as appropriate signals are generated by the sensors when the marking is passed.

A further advantageous embodiment consists in the fact that the tolerance value is determined using a computing program in the computing unit, wherein the computing program is based on an artificial intelligence method. Such teaching of the reference value and of the associated tolerances which is based on the principles of artificial intelligence is advantageous insofar as the same method can be adapted to the most varied of gears and power transmissions in a correspondingly adapted computing unit.

As already described above, there is a particularly advantageous use of the method according to the invention in the monitoring of an encapsulated steering gear, which is therefore no longer accessible after its production, with two power-transmitting endless drive belts in the form of traction belts.

A belt drive, which is designed in its entire concept in an advantageous manner and from the outset for the use of the method according to the invention, has at least one drive pulley driven by an electric drive motor, a driven pulley and at least one power-transmitting endless drive belt which is in the form of a traction belt and wraps around the drive and driven pulleys circumferentially over a partial circumference in each case.

At least one first marking and at least one first sensor element which is assigned to the belt and is intended to detect the first marking are provided on the belt, wherein the first sensor element has electronic devices for outputting a signal $S_R$ dependent on the detection of the first marking. The rotor of the electric drive motor has at least one rotary encoder or position encoder, for example as an incremental or absolute encoder, which can be used to detect the position or speed of the rotor during the motor rotation and to output a signal $S_M$ dependent on the position or speed.

Furthermore, a computing unit provided with memories and processors for processing the signals $S_R$ and $S_M$ is provided, wherein a temporal or local correlation of the occurrence of the signals $S_R$ and $S_M$ can be calculated in the computing unit when the drive belt is new and can be stored as a reference value and can be compared with corresponding correlations for repeated further specified belt revolutions or periods of time. A warning or alarm signal can be generated by the computing device after a specified tolerance value between the current correlation and the reference value has been exceeded. Such a belt drive can be used for a wide range of applications and many drive tasks without major changes in production and allows precise and simple control.

An advantageous embodiment of such a belt drive consists in the fact that the first marking (11, 12) is designed as a narrow strip provided with ferromagnetic or electrically conductive particles on the belt, preferably on the back of the belt. Use is preferably made here of a strip which is formed transversely with respect to the longitudinal direction of the belt and forms a clear and locally narrowly delimited signal when passing the sensor.

A further advantageous embodiment of such a belt drive consists in the fact that the ferromagnetic or electrically conductive particles are present in the form of a mixture additive in the base material of the belt.

A further advantageous embodiment of such a belt drive consists in the fact that the ferromagnetic or electrically conductive particles are applied as a rubber or fabric imprint. In particular, the two last-mentioned embodiments are advantageous as a result of the fact that the mechanical properties of the belt are not influenced or are hardly noticeably influenced, and the service life and durability of the belt therefore remain unaffected.

Adapted to a steering gear of a motor vehicle, an advantageous embodiment results from the fact that the belt drive has two drive traction belts, preferably in the form of toothed belts, as well as two drive and driven pulleys, wherein the drive pulleys and the driven pulleys are each continuously connected to one another in a rotationally fixed manner on a common shaft. Both drive traction belts then have at least one marking and at least one associated sensor element for detecting the belt markings is respectively provided, wherein the sensor elements have an electronic device for outputting the signals $S_{R1}$ and $S_{R2}$ which are dependent on the detection of the markings.

The rotor of the electric drive motor has at least one rotary encoder or position encoder which can be used to detect the position or speed of the rotor during the motor rotation and to output a signal $S_M$ dependent on the position or speed. A computing unit provided with memories and processors for processing the signals $S_{R1}$, $S_{R2}$ and $S_M$ is likewise provided. The processing takes place as already described above for a redundant steering gear.

The invention shall be explained in more detail on the basis of an exemplary embodiment. In the figures:

DETAILED DESCRIPTION

Figure 1:
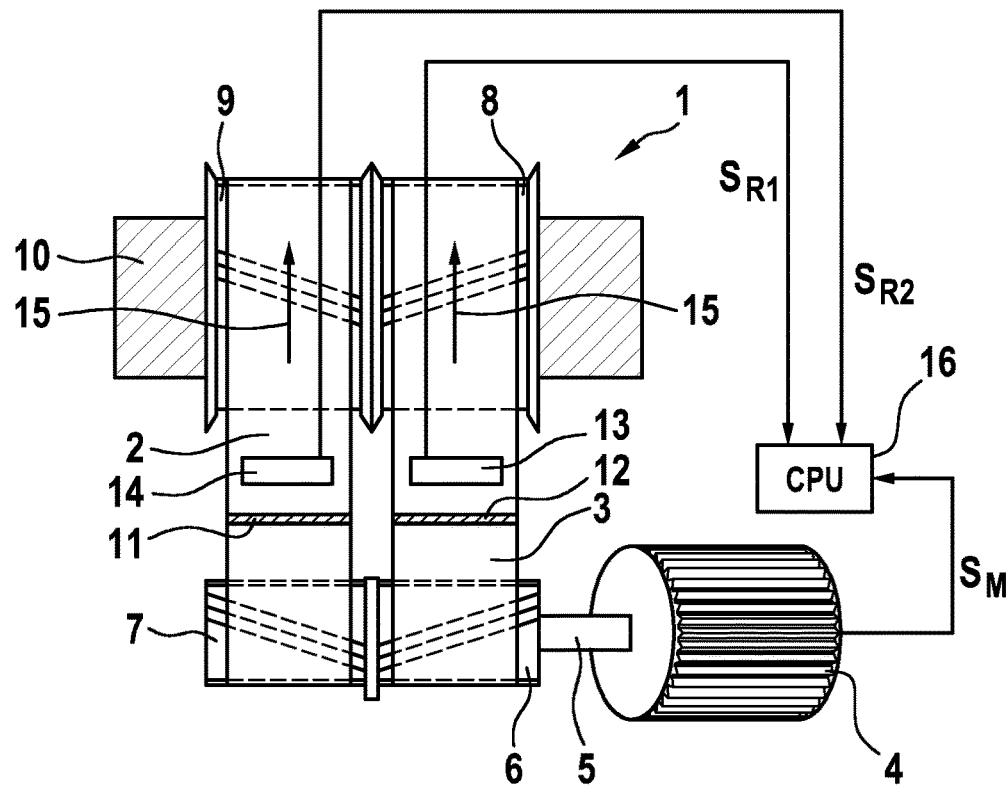
FIG. 1 basically shows the design of a steering gear according to the invention.

FIG. 1 shows, in the form of a schematic diagram, the design of a steering gear 1 of an automobile, in which a redundant design with two parallel toothed belts 2, 3 is selected as an endless drive belt. Each toothed belt is designed in such a way that, in the event of the failure of the other toothed belt in each case, it can transmit the entire power and can thus guarantee safe steerability of the vehicle even in the event of damage.

Furthermore, two toothed drive pulleys 6, 7 arranged on a common drive shaft 5 driven by a drive motor 4 in the form of an electric motor are provided. In the case of the steering gear constructed in this way with a redundant drive, there are also two driven pulleys 8, 9 which are arranged on a common output shaft 10. Both belts 2, 3 each have a first belt marking 11, 12, here designed as strips of polymeric material with magnetizable particles applied over the respective belt width on the back of the belt. The two belts are each assigned a sensor element 13, 14 which detects the respective belt marking 11, 12 as soon as it passes the sensor, i.e. passes below the sensor in this case. The sensor elements each have electronic devices (not shown in greater detail here) for outputting signals $S_{R1}$ and $S_{R2}$ which depend on the detection of the belt markings, i.e. are always output when the passage of a marking 11, 12 is detected by the sensor elements 13, 14 in the case of belts 2, 3 revolving in the drive direction 15.

The rotor (not shown in greater detail here) of the drive motor has second markings as well as a second sensor element which is provided with corresponding electronic devices, is assigned to the drive motor and detects the rotor rotation, that is to say that, during the rotor rotation, the passage of the second markings is detected by the second sensor element and a signal $S_M$ dependent on the detection of the second marking is output.

For this purpose, the rotor of the electric motor 4 is provided here with a commercially available, incremental position encoder which, as an incremental encoder, allows the position of the rotor to be directly detected while the motor is rotating and also allows the speed to be determined therefrom. A signal $S_M$ dependent on the position and/or speed can therefore be output for the motor position and motor rotations.

Furthermore, a CPU (central processor unit) is provided, namely a computing unit 16 provided with memories and processors for processing the signals $S_{R1}$, $S_{R2}$ and $S_M$. The temporal or local correlation of the occurrence of the signals $S_{R1}$, $S_{R2}$ and $S_M$ is calculated in the computing unit when the drive belt is new and is stored as a reference value. The corresponding associated signals are then repeatedly determined for further specified belt revolutions or periods of time and their current temporal or local correlation of the occurrence is compared with the reference value, wherein a warning or alarm signal is output by the computing device after a specified tolerance value between the current correlation and the reference value has been exceeded.

In the exemplary embodiment presented here, on the one hand, signals $S_{R1}$ and $S_{R2}$ which are proportional to the number of respective belt revolutions are generated and, on the other hand, the rotor revolutions of the drive motor are determined and are output as a signal $S_M$ proportional to the speed of the drive motor.

With such a design, an angular offset between the drive belt and the drive belt pulley and/or between the drive belts can also be determined in the computing unit by way of a change in the temporal or local correlation of the occurrence of the signals $S_{R1}$, $S_{R2}$ and $S_M$. A statement regarding the relationship of the two drive belts with respect to one another and their offset which has possibly arisen during revolution is thus also obtained. In the case of steering gears, there is thus an important checking method which can both determine the failure of a belt or predict the impending failure of a belt and allow continued monitoring of an individual belt after such a failure.

Figure 2:
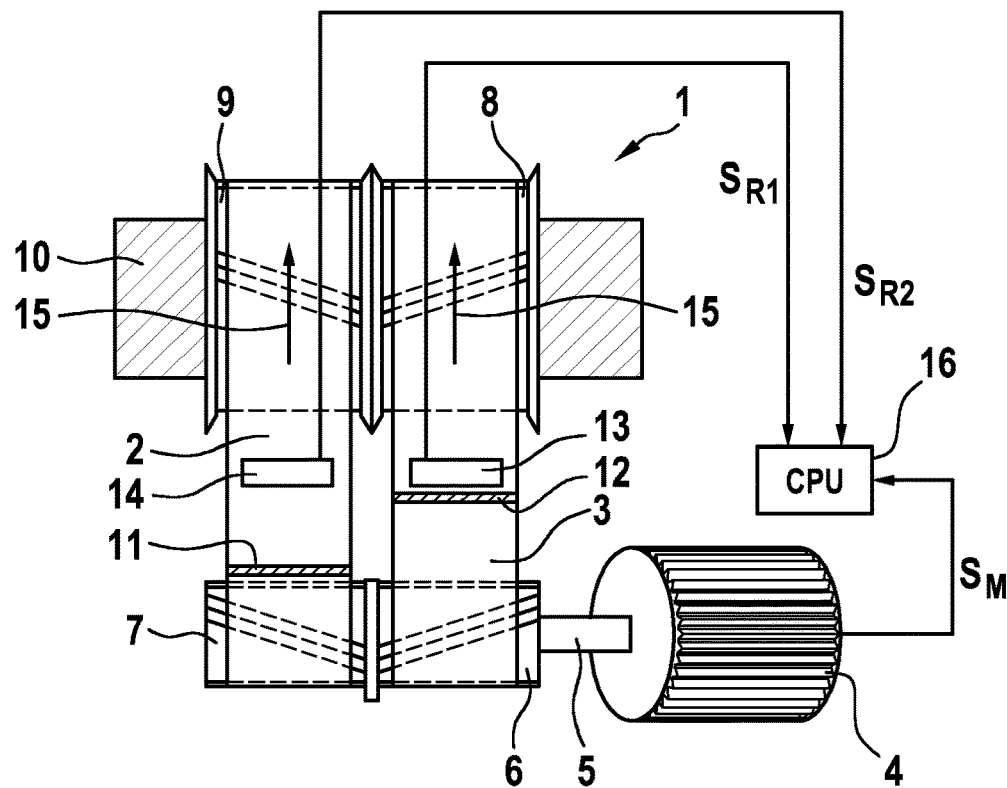
FIG. 2 shows the steering gear according to FIG. 1 after one or more skipped teeth, FIG. 3 Shows a typical signal profile for a complete motor revolution when using a commercially available incremental position encoder.

FIG. 2 shows such a case, wherein, after one or more skipped teeth due to overloading, a circumferential offset between the drive belts 2 and 3, and thus also an angular offset between one of the drive belts and the associated drive belt pulley of the toothed belt, has arisen. Even if the ability to steer is still readily available afterward, at least one of the two belts has been overloaded, with the result that a belt replacement could possibly be necessary after a corresponding catalog of load collectives. In the case of an encapsulated steering gear of an automobile, such a precise check would not be possible without the method according to the invention and the skipped tooth would remain undetected.

Figure 3:
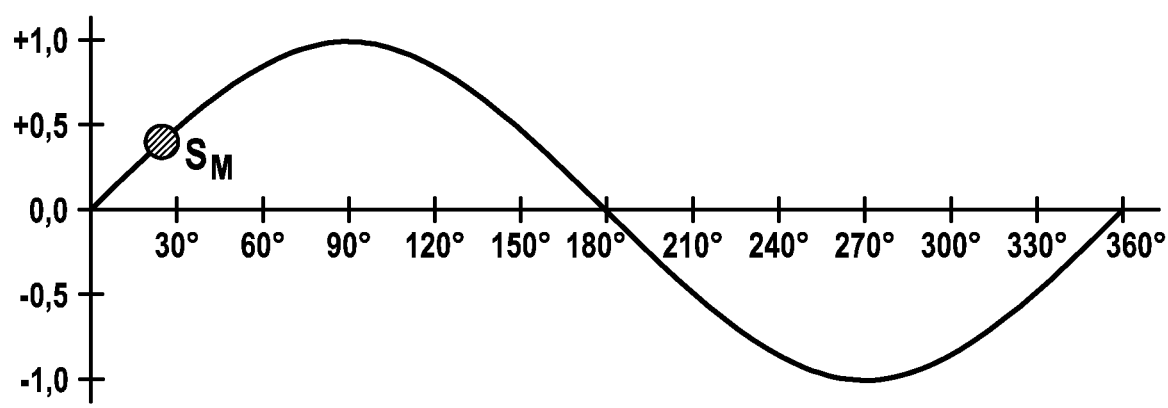

FIG. 3 shows the rotor position in principle only for the sake of clarity, namely a typical signal profile for a complete motor revolution when using a commercially available, incremental position encoder, wherein the respective position is represented by the signal value $S_M$. The correlation of this signal value with the signal values $S_{R1}$ and $S_{R2}$ thus enables the procedure according to the invention.

LIST OF REFERENCE SIGNS

Part of the Description

1 Steering gear
2 Toothed belt
3 Toothed belt
4 Drive motor/electric motor
5 Drive shaft
6 Drive pulley
7 Drive pulley
8 Driven pulley
9 Driven pulley
10 Output shaft
11 Belt marking
12 Belt marking
13 Sensor element
14 Sensor element
15 Drive direction
16 Computing unit (CPU)

The invention claimed is:

1. A method for monitoring a belt drive, the method comprising:
   providing at least one drive pulley driven by a drive motor, a driven pulley and at least one power-transmitting endless drive belt which is in the form of a traction belt and wraps around the drive and driven pulleys circumferentially over a partial circumference in each case;
   wherein the belt has at least one first marking and at least one first sensor element assigned to the belt is provided;
   wherein the passage of the first marking is detected by the first sensor element during the belt revolution and the first sensor element has electronic devices for outputting a signal $S_R$ dependent on the detection of the first marking;
   wherein the rotor of the drive motor has at least one second marking and a second sensor element which is provided with corresponding electronic devices and is assigned to the drive motor is provided, wherein, while the rotor is rotating;
   the passage of the second marking is detected by the second sensor element and a signal $S_M$ dependent on the detection of the second marking is output, in that, furthermore, a computing unit provided with memories and processors for processing the signals $S_R$ and $S_M$ is provided;
   a temporal or local correlation of the occurrence of the signals $S_R$ and $S_M$ is calculated in the computing unit when the drive belt is new and is stored as a reference value;
   wherein the associated signals $S_R$ and $S_M$ are then repeatedly determined for further specified belt revolutions or periods of time and their current temporal or local correlation of the occurrence is compared with the reference value; and
   wherein a warning or alarm signal is output by the computing device after a specified tolerance value between the current correlation and the reference value has been exceeded.

2. The method as claimed in claim 1, further comprising:
   the first sensor element has electronic devices for outputting a signal $S_R$ proportional to the number of belt revolutions;
   the rotor position of the drive motor is determined by the second sensor element and is output as a signal $S_M$ proportional thereto;
   the initial relationship between a specified number $N_R$ of belt revolutions and the rotor position determined for this, which is present when the belt drive is new, is calculated in the computing unit and is stored as a reference value; and
   wherein the associated rotor positions are then repeatedly determined for further belt revolutions corresponding to the specified number $N_R$ and their current relationship is compared with the reference value, wherein a warning or alarm signal is output by the computing device after a specified tolerance value between the current relationship and the reference value has been exceeded.

3. The method as claimed in claim 1, further comprising:
the first sensor element has electronic devices for outputting a signal $S_R$ proportional to the number of belt revolutions, in that the rotor revolutions of the drive motor are determined by the second sensor element and are output as a signal $S_M$ proportional to the speed of the drive motor;
the relationship between a specified number $N_R$ of belt revolutions and the motor revolutions determined for this, which is present when the drive belt is new, is calculated in the computing unit and is stored as a reference value;
the associated motor speeds are then repeatedly determined for further belt revolutions corresponding to the specified number $N_R$ and their current relationship is compared with the reference value; and
a warning or alarm signal is output by the computing device after a specified tolerance value between the current relationship and the reference value has been exceeded.

4. The method as claimed in claim 1, wherein the tolerance value between the current relationship and the reference value is specified as a difference in location, time or speed corresponding to a predetermined slip.

5. The method as claimed in claim 1, wherein the drive belt or belts is/are in the form of toothed belts and at least one difference in location, time or speed corresponding to a skipped tooth is specified as the tolerance value between the current relationship and the reference value.

6. The method as claimed in claim 1, wherein the rotor rotation or the rotor position is determined via a CAN bus of the motor and is output as a signal $S_M$ and is processed in the computing unit for the purpose of calculating the correlations.

7. The method as claimed in claim 1, wherein the belt markings are detected by the associated sensor elements using optical, inductive, capacitive or magnetic methods.

8. The method as claimed in claim 1, wherein the tolerance value is determined using a computing program in the computing unit, wherein the computing program is based on an artificial intelligence method.

9. The method as claimed in claim 1, wherein for monitoring a steering gear with two power-transmitting, endless drive belts in the form of drive belts.

10. The method as claimed in claim 1 further comprising:
wherein both belts have a marking and both belts are each assigned a sensor element which detects the respective belt marking, wherein the sensor elements have electronic devices for outputting signals $S_{R1}$ and $S_{R2}$ which are dependent on the detection of the belt markings;
a temporal or local correlation of the occurrence of the signals $S_{R1}$, $S_{R2}$ and $S_M$ is calculated in the computing unit when the drive belt is new and is stored as a reference value; and
the associated signals $S_{R1}$, $S_{R2}$ and $S_M$ are then repeatedly determined for further specified belt revolutions or periods of time and their current temporal or local correlation of the occurrence is compared with the reference value.

11. The method as claimed in claim 10, wherein an angular offset between the drive belt and the drive belt pulley and/or between the drive belts is determined in the computing unit by way of a change in the temporal or local correlation of the occurrence of the signals $S_{R1}$, $S_{R2}$ and $S_M$.

12. The method as claimed in claim 1, the method further comprising determining an angular offset between the drive belt and the drive belt pulley by the computing unit based on correlation of the signals $S_{R1}$, $S_{R2}$ and $S_M$, the signal $S_R$ comprises the signals $S_{R1}$, $S_{R2}$, the signal $S_{R1}$ is based on the belt and the signal $S_{R2}$ is based on a second belt.

13. The method as claimed in claim 12, the method further comprising determining a circumferential offset between the belt and the second belt based on the signals $S_{R1}$, $S_{R2}$.

14. The method as claimed in claim 13, the signals $S_{R1}$ is proportional to revolutions of the belt and the signal $S_{R2}$ is proportional to revolutions of the second belt and the signal $S_M$ is proportional to the speed of the drive motor.

15. The method as claimed in claim 14, the method further comprising the computing unit determining an overload of the belt based on the circumferential offset and the angular offset.

16. A belt drive comprising:
at least one drive pulley driven by an electric drive motor;
a driven pulley; and
at least one power-transmitting endless drive belt which is in the form of a traction belt and wraps around the drive and driven pulleys circumferentially over a partial circumference in each case;
wherein the belt has at least one first marking and at least one first sensor element which is assigned to the belt and is intended to detect the first marking is provided, wherein the first sensor element has electronic devices for outputting a signal $S_R$ dependent on the detection of the first marking, wherein the rotor of the electric drive motor has at least one rotary encoder or position encoder (as an incremental or absolute encoder) which can be used to detect the position or speed of the rotor during the motor rotation and to output a signal $S_M$ dependent on the position or speed;
a computing unit provided with memories and processors for processing the signals $S_R$ and $S_M$ is provided, wherein a temporal or local correlation of the occurrence of the signals $S_R$ and $S_M$ can be calculated in the computing unit when the drive belt is new and can be stored as a reference value and can be compared with corresponding correlations for repeated, further specified belt revolutions or periods of time; and
wherein a warning or alarm signal can be generated by the computing device after a specified tolerance value between the current correlation and the reference value has been exceeded.

17. The belt drive as claimed in claim 16, further comprising:
the belt drive comprised in a steering gear of a motor vehicle;
the belt drive has two drive traction belts;
two drive and driven pulleys;
wherein the drive pulleys and the driven pulleys are each continuously connected to one another in a rotationally fixed manner on a common shaft;
wherein both drive traction belts have at least one marking and at least one associated sensor element for detecting the belt markings is respectively provided;
wherein the sensor elements have electronic devices for outputting the signals $S_{R1}$ and $S_{R2}$ which are dependent on the detection of the markings;
wherein the rotor of the electric drive motor has at least one rotary encoder or position encoder which can be used to detect the position or speed of the rotor during the motor rotation and to output a signal $S_M$ dependent on the position or speed;
wherein a computing unit provided with memories and processors for processing the signals $S_{R1}$, $S_{R2}$ and $S_M$, and wherein a temporal or local correlation of the occurrence of the signals $S_{R1}$, $S_{R2}$ and $S_M$ is calculated in the computing unit when the drive belt is new and is stored as a reference value;

wherein the associated signals $S_{R1}$, $S_{R2}$ and $S_M$ are then repeatedly determined for further specified belt revolutions or periods of time and their current temporal or local correlation of the occurrence is compared with the reference value.

18. The belt drive as claimed in claim 16, wherein the first marking is designed as a narrow strip provided with ferromagnetic or electrically conductive particles on the belt on the back of the belt.

19. The belt drive as claimed in claim 18, wherein the ferromagnetic or electrically conductive particles are present in the form of a mixture additive in the base material of the belt.

20. The belt drive as claimed in claim 18, wherein the ferromagnetic or electrically conductive particles are applied as a rubber or fabric imprint.

21. A method for monitoring a drive belt, the method comprising:
providing a steering gear having first and second toothed belts of the drive belt arranged in parallel;
marking the first and second belts with a first marking of strips of polymeric materials with magnetizable particles applied over a belt width on back sides for the first and second belts;
sensing the first and second belts with first and second electronic devices to generate signals SR1 and SR2 for the first and second belts respectively;
detecting the passage of the first marking of the first and second belts based on the signals SR1 and SR2;
providing second markings on a rotor of a drive motor;
sensing the rotor with a third electronic device to generate a rotor signal SM;
detecting passage of the second markings based on the rotor signal SM;
determining a speed of the rotor based on the signal SM; and
determining an angular offset between the drive belt and the rotor by one or more processors based on the signals SR1, SR2 and SM.

22. The method of claim 21, further comprising:
determining an initial rotor position;
determining an initial relationship between a specified number $N_R$ of belt revolutions and the initial rotor position;
storing the initial relationship as a reference value;
repeatedly determining associated rotor positions for further belt revolutions and comparing the determined positions with the reference value; and
generating an alarm based on the determined positions varying beyond a selected tolerance.

23. The method of claim 21, wherein a tolerance value between the current relationship and the reference value is specified as a difference in location, time or speed corresponding to a predetermined slip.

24. The method of claim 21, further comprising forming a strip of ferromagnetic materials on the back sides of the first and second belts.

25. The method of claim 24, further comprising forming a mixture additive having the ferromagnetic materials and forming an imprint to apply the ferromagnetic material.

26. The method of claim 25, further comprising adding an adhesive to the mixture.

* * * * *